(12) United States Patent
Kazakov et al.

(10) Patent No.: US 12,412,119 B2
(45) Date of Patent: Sep. 9, 2025

(54) CLUSTERING OF MACHINE LEARNING (ML) FUNCTIONAL COMPONENTS

(71) Applicant: ADVANCED MICRO DEVICES, INC., Santa Clara, CA (US)

(72) Inventors: Maxim V. Kazakov, San Diego, CA (US); Milind N. Nemlekar, San Diego, CA (US); Swapnil Sakharshete, San Diego, CA (US); Vineet Goel, San Diego, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 1290 days.

(21) Appl. No.: 17/135,383

(22) Filed: Dec. 28, 2020

(65) Prior Publication Data

US 2022/0207411 A1    Jun. 30, 2022

(51) Int. Cl.
*G06N 20/00* (2019.01)
*G06F 7/57* (2006.01)
*G06F 12/1081* (2016.01)
*G06T 1/20* (2006.01)

(52) U.S. Cl.
CPC ............... *G06N 20/00* (2019.01); *G06F 7/57* (2013.01); *G06F 12/1081* (2013.01); *G06T 1/20* (2013.01)

(58) Field of Classification Search
CPC ....... G06N 20/00; G06F 7/57; G06F 12/1081; G06T 1/20
See application file for complete search history.

(56) References Cited

U.S. PATENT DOCUMENTS

2019/0370072 A1* 12/2019 Walter .................. G06F 9/5016
2021/0034136 A1*  2/2021 Hovis ................... G06F 1/3275
2021/0374607 A1* 12/2021 Kazakov ............. G06F 15/7807

* cited by examiner

*Primary Examiner* — David E Choi (57) ABSTRACT

A graphics processing unit (GPU) for clustering of machine learning (ML) functional components, including: a plurality of compute units; a plurality of ML clusters, wherein each of the ML clusters comprises at least one arithmetic logic unit (ALU), and wherein each of the ML clusters is associated with a respective subset of the compute units; and a plurality of memory modules each positioned on the GPU adjacent to a respective ML cluster of the plurality of ML clusters, wherein each ML cluster is configured to directly access one or more adjacent memory modules.

20 Claims, 5 Drawing Sheets

ML Cluster 106

Directly Access At Least One Memory Module Of A GPU Adjacent To The ML Cluster 202

Store, By A DMA Engine Of The ML Cluster, Data Into A Scratchpad Portion Of The At Least One Memory Module 302

Perform At Least A Portion Of A GEMM Operation Using The Directly Accessed At Least One Memory Module 204

Perform, By An Arithmetic Logic Unit (ALU) Of The ML Cluster, At Least One Operation On The Data Stored In The Scratchpad Portion Of The At Least One Memory Module 304

CLUSTERING OF MACHINE LEARNING (ML) FUNCTIONAL COMPONENTS

BACKGROUND

In existing graphics processing unit (GPU) architectures, machine learning arithmetic units (ML ALUs) are dedicated for use by one or more compute units (CU). To accelerate matrix multiplication operations using the GPU (e.g., for machine learning operations), a general matrix multiply (GEMM) operation is partitioned across the CUs. With the ML ALUs consuming a significant portion of GPU power, increased power efficiency is possible by using separate voltage domains for the ML ALUs. However, the increased power efficiency comes with an area cost, requiring additional space on the GPU.

DETAILED DESCRIPTION

In some embodiments, a graphics processing unit (GPU) for clustering of machine learning (ML) functional components includes: a plurality of compute units; a plurality of ML clusters, wherein each of the ML clusters includes at least one arithmetic logic unit (ALU), and wherein each of the ML clusters is associated with a respective subset of the compute units; and a plurality of memory modules each positioned on the GPU adjacent to a respective ML cluster of the plurality of ML clusters, wherein each ML cluster is configured to directly access one or more adjacent memory modules.

In some embodiments, the plurality of ML clusters are associated with a first voltage domain distinct from at least one second voltage domain of the GPU. In some embodiments, a first portion of the memory modules includes cache memory and a second portion of the memory modules includes scratchpad memory. In some embodiments, the plurality of memory modules include static random access memory (SRAM) modules. In some embodiments, each of the ML clusters include at least one direct memory access (DMA) engine. In some embodiments, each of the ML clusters include a controller configured to issue commands to the at least one ALU and the at least one DMA engine. In some embodiments, the GPU further includes at least one control processor configured to issue commands to the at least one ML cluster.

In some embodiments, an apparatus for clustering of machine learning (ML) functional components includes: a component; a graphics processing unit (GPU) operatively coupled to the component, the GPU including: a plurality of compute units; a plurality of ML clusters, wherein each of the ML clusters includes at least one arithmetic logic unit (ALU), and wherein each of the ML clusters is associated with a respective subset of the compute units; and a plurality of memory modules each positioned on the GPU adjacent to a respective ML cluster of the plurality of ML clusters, wherein each ML cluster is configured to directly access one or more adjacent memory modules.

In some embodiments, the plurality of ML clusters are associated with a first voltage domain distinct from at least one second voltage domain of the GPU. In some embodiments, a first portion of the memory modules includes cache memory and a second portion of the memory modules includes scratchpad memory. In some embodiments, the plurality of memory modules include static random access memory (SRAM) modules. In some embodiments, each of the ML clusters include at least one direct memory access (DMA) engine. In some embodiments, each of the ML clusters include a controller configured to issue commands to the at least one ALU and the at least one DMA engine. In some embodiments, the GPU further includes at least one control processor configured to issue commands to the at least one ML cluster.

A method of clustering of machine learning (ML) functional components, including: directly accessing, by a ML cluster of a plurality of ML clusters of a GPU, at least one memory module of the GPU adjacent to the ML cluster; and performing, by the ML cluster, at least a portion of a general matric multiply (GEMM) operation using the directly accessed at least one memory module.

In some embodiments, directly accessing the at least one memory module includes storing, by a DMA engine of the ML cluster, data into a scratchpad portion of the at least one memory module; and performing the at least a portion of the GEMM operation includes performing, by an arithmetic logic unit (ALU) of the ML cluster, the at least one operation on the data stored in the scratchpad portion of the at least one memory module. In some embodiments, the method further includes comprising maintaining a first voltage domain separate for the plurality of ML clusters separate from at least one second voltage domain of the GPU. In some embodiments, the method further includes: receiving, by a controller of the ML cluster, a first command; and issuing, based on the first command, at least one second command to the ALU and the DMA engine of the ML cluster. In some embodiments, the first command is received from a control processor of the GPU. In some embodiments, the first command is received from a compute unit of a plurality of compute units of the GPU.

In existing graphics processing unit (GPU) architectures, machine learning arithmetic units (ML ALUs) are dedicated for use by one or more a compute units (CU). A compute unit as the term is used in this specification refers to a collection of one or more cores that share a common local cache. The ML ALUs are logical blocks configured for performing matrix arithmetic operations. To accelerate matrix multiplication operations using the GPU (e.g., for machine learning operations), a general matrix multiply (GEMM) operation is partitioned across the CUs. Data is brought from memory through a cache hierarchy to the ML ALUs. With the ML ALUs consuming a significant portion of GPU power, increased power efficiency is possible by using separate voltage domains for the ML ALUs. However, the increased power efficiency comes with an area cost, requiring additional space on the GPU. Accordingly, there is a need to both improve the power efficiency of the ML ALUs, reduce the data delivery power cost to the ML ALUs from memory and cache, and reduce data access latency.

Figure 1:
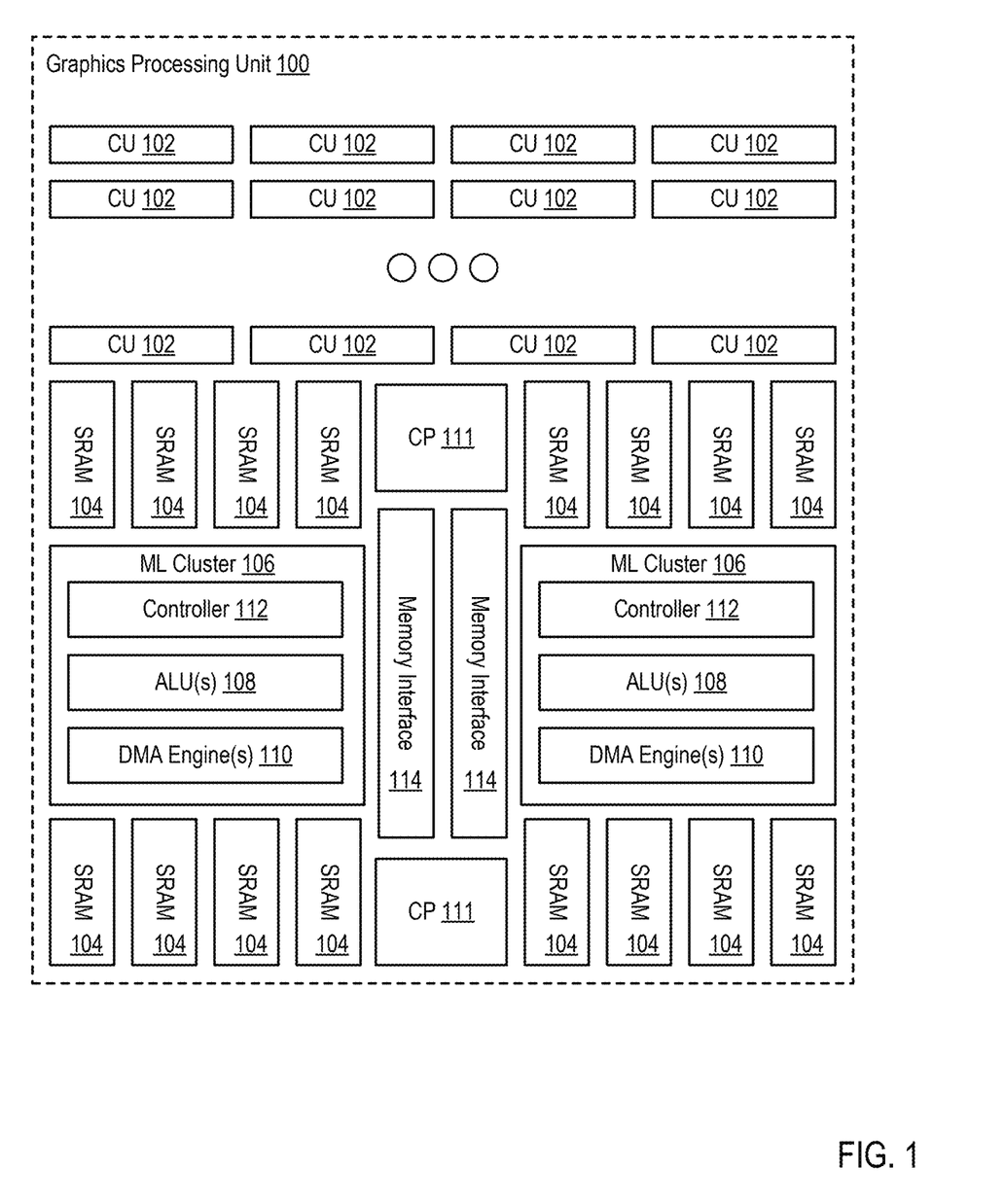
FIG. 1 is a block diagram of an example graphics processing unit for clustering of machine learning (ML) functional components according to some embodiments.

To address these needs, FIG. 1 shows a block diagram of a non-limiting example graphics processing unit (GPU) 100 for clustering of machine learning (ML) functional components. The example GPU 100 can be implemented in a variety of computing devices, including mobile devices, personal computers, peripheral hardware components, gaming devices, set-top boxes, and the like. The GPU 100 includes a plurality of compute units (CUs) 102. A CU 102 is a grouping of one or more cores that share a common local cache (described below). In some embodiments, each CU 102 implements a single instruction, multiple data (SIMD) engine to perform the same operation on multiple data points simultaneously to facilitate data parallelism and parallel data processing. In some embodiments, each CU 102 includes various functional components (not shown), including L1 cache memory, vector general purpose registers (VGPRs), scalar general purpose registers (SGPRs), texture mapping units (TMUs), and the like.

Also included in the GPU 100 are a plurality of static random access memory (SRAM) 104 modules. Although the GPU 100 shows SRAM 104 modules as an example, it is understood that other types of memory modules are usable in some embodiments. The SRAM 104 modules form a shared L2 cache for the GPU 100. In some embodiments, the SRAM 104 provides a shared L2 cache that is shared amongst CUs 102 and other components of the GPU 100 described below. In other embodiments, the SRAM 104 provides a shared L2 cache that is shared amongst other components operatively coupled to the GPU 100 in an apparatus or system, such as other GPUs 100, central processing units (CPUs), and the like. In some embodiments, the SRAM 104 is operatively coupled to a data fabric connecting the GPU 100 to other GPUs or CPUs to allow these other components to control and access the SRAM 104 and ML (machine learning) clusters 106, described in further detail below, thereby accelerating the machine learning capabilities of a system.

The GPU 100 also includes ML clusters 106. The ML clusters 106 are functional blocks for performing accelerated matrix arithmetic operations and associated memory access operations. Each ML cluster 106 includes one or more arithmetic logic units (ALUs) 108, including ML ALUs, that perform arithmetic operations on input data (e.g., input matrices). Each ML cluster 106 also includes one or more direct memory access (DMA) engines 110. The DMA engines 110 perform DMA operations on the SRAM 104, particularly as required to perform a portion of a general matrix multiply (GEMM) operation as instructed by a CU 102 or control processor (CP) 111, described below. A GEMM operation is a matrix multiplication operation expressed as X=aAB+bC, where A and B are optionally transposed or Hermitian-conjugated inside the routine. Ordinary matrix multiplication is achievable by setting "a" and "b" to one and C to an all-zero matrix of appropriate size. Although the following discussion describes functionality with respect to GEMM operations, it is understood that such functionality is applicable to other matrix operations, or other mathematical operations, as can be appreciated.

For example, the DMA engines 110 store data (e.g., operands of an instruction or data loaded from other memory sources) in the SRAM 104 for the ALUs 108 to operate on. The ML clusters 106 also include controllers 112. The controllers 112 receive commands from ML cluster 106 clients from a CU 102 or CP 111. For example, such commands are portions of a decomposed GEMM operation being performed by a particular CU 102. The controller 112 schedules operations for execution on the ALUs 108 or the DMA engines 110. For example, given a command to perform a particular operation on particular data, the controller 112 schedules the DMA engines 110 to load the particular data into SRAM 104 and for the ALU 108 to operate on the data as loaded into SRAM 104. Accordingly, the controller 112 maintains proper synchronization between the ALUs 108 and DMA engines 110 to perform their respective operations.

In some embodiments, the SRAM 104 is partitioned into cache memory and scratchpad memory. In other words, a first portion of the SRAM 104 is allocated as cache memory and a second portion of the SRAM 104 is allocated as scratchpad memory. The scratchpad memory is a portion of memory allocated for temporary storage of calculations or other data. For example, a portion of the SRAM 104 is allocated as scratchpad memory for storing inputs to the ALUs 108. For example, the DMA engines 110 store data in scratchpad memory for use as inputs to the ALUs. As the scratchpad is allocated distinctly from the cache portions of the SRAM 104, data stored in the scratchpad memory is not maintained according to cache coherency protocols, nor is the data stored in the scratchpad memory necessarily stored in main memory, in contrast to cache memory. The use of scratchpad memory reduces latency for ALU 108 inputs and minimized data delivery power required for ALU 108 operations.

The ML clusters 106 are positioned in the GPU 100 adjacent to the SRAM 104 (e.g., adjacent to the L2 cache). By reducing the distance between the ML clusters 106 and SRAM 104, data delivery costs between the ML clusters 106 and SRAM 104 are reduced. In some embodiments, the ML clusters 106 are operatively coupled to the SRAM 104 using private buses (e.g., buses dedicated for data transfer between ML clusters 106 and SRAM 104 and inaccessible to other components of the GPU 100). For example, the GPU 100 includes private, short distance, high bandwidth buses to minimize data access latency and increase performance per watt. As was described above, the ML clusters 106 access the SRAM 104 using private, short distance buses (e.g., via the DMA engines 110). To facilitate access to the SRAM 104 by CUs 102, in some embodiments, the GPU 100 includes one or more memory interfaces 114. The memory interfaces 114 provide an interconnect between the CUs 102 and SRAM 104.

The GPU 100 also includes one or more control processors (CPs) 111. The CPs 111 schedule workload for the GPU 100. Accordingly, the CPs 111 receive work or commands from other components of a system (e.g., CPUs) and schedule the work for execution on the various portions of the GPU 100. For example, the CPs 111 decompose problems such as GEMM problems for distributed execution across CUs 102. The CPs 111 also issues commands or instructions to the ML clusters 106 for execution.

In some embodiments, the GPU 100 maintains different voltage domains for the ML clusters 106 relative to other components of the GPU 100. Components within a given voltage domain receive a same voltage. Thus, the GPU 100 includes components such as voltage regulators (not shown) or other components to control voltage distribution such that the ML clusters 106 receive a different voltage relative to the remaining components of the GPU 100. It is understood that the remaining components of the GPU 100 may also receive voltages according to a single voltage domain, or multiple voltage domains. As the ML clusters 106 will use a significant amount of power relative to the entire GPU 100, the use of separate voltage domains increases overall power efficiency of the GPU 100 and increases the overall performance of the GPU 100 per watt of power consumed.

One skilled in the art will appreciate that the particular configuration of the GPU 100 and the arrangement, layout, and geometries of the GPU 100 components are examples and that other arrangements or configurations are included in other embodiments. For example, while the GPU 100 shows four columns of CUs 102, it is understood that fewer or additional columns of CUs 102 are possible. As another example, while the GPU 100 shows two CPs 111, one skilled in the art will appreciate that, in other embodiments, fewer or greater CPs 111 are possibly included in the GPU 100. As a further example, while the GPU 100 shows two ML clusters 106, one skilled in the art will appreciate that other embodiments will include fewer or greater numbers of ML clusters 106. Accordingly, the particular layout and configuration of SRAM 104 will be adjusted according to the number of ML clusters 106 in the GPU.

Figure 2:
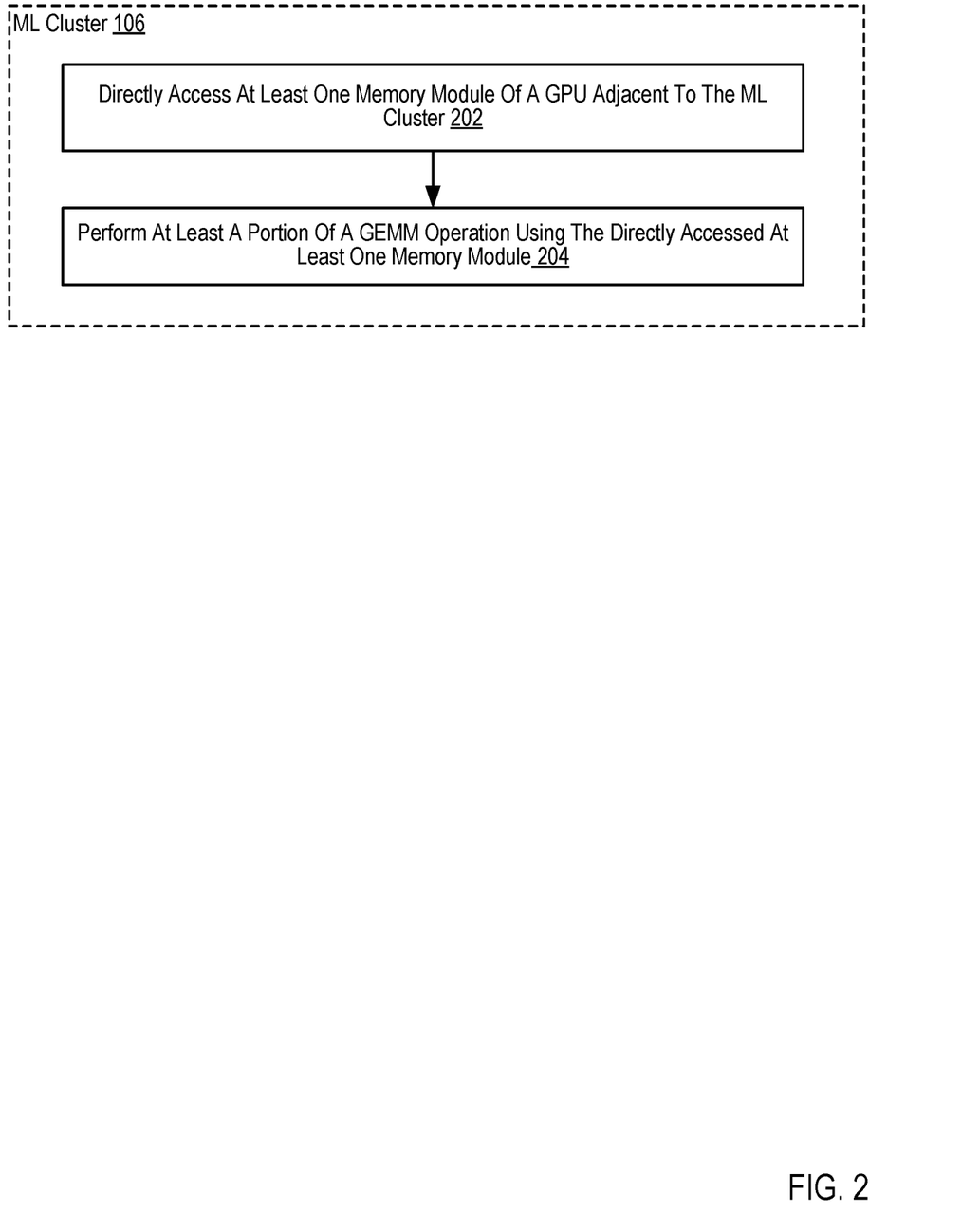
FIG. 2 is a flowchart of an example method for clustering of machine learning (ML) functional components according to some embodiments.

For further explanation, FIG. 2 sets forth a flow chart illustrating an example method for clustering of machine learning (ML) functional components that includes directly accessing 202 (e.g., by an ML cluster 106 of a plurality of ML clusters 106) at least one memory module of a GPU 100 adjacent to the ML cluster 202. In some embodiments, the at least one memory module of the GPU 100 includes at least one SRAM 104 module. At least a portion of the at least one SRAM 104 module is used as cache memory (e.g., L2 cache) for the GPU 100. The ML clusters 106 are positioned in the GPU 100 adjacent to the SRAM 104 (e.g., adjacent to the L2 cache). By reducing the distance between the ML clusters 106 and SRAM 104, data delivery costs between the ML clusters 106 and SRAM 104 are reduced. In some embodiments, the ML clusters 106 are operatively coupled to the SRAM 104 using private buses (e.g., buses dedicated for data transfer between ML clusters 106 and SRAM 104 and inaccessible to other components of the GPU 100). For example, the GPU 100 includes private, short distance, high bandwidth buses to minimize data access latency and increase performance per watt.

The ML cluster 106 directly accesses the at least one memory module in that the ML cluster 106 accesses the at least one memory module without the use of any intervening components other than a direct connection, such as the private bus described above. In some embodiments, directly accessing 202 the at least one memory module of the GPU 100 is performed by a DMA engine 110 of the ML cluster 106. Accordingly, directly accessing 202 the at least one memory module includes performing a DMA operation by the DMA engine 110 on the at least one memory module. Directly accessing 202 the at least one memory module includes a read operation directed to the at least one memory module or a write operation directed to the at least one memory module.

The method of FIG. 2 also includes performing 204 (e.g., by the ML cluster 106) at least a portion of a GEMM operation using the directly accessed at least one memory module. For example, assume that the GPU 100 is performing a GEMM operation. The GEMM operation is decomposed and distributed across the CUs 102 of the GPU 100 to allow for parallel and distributed computation of the GEMM operation. A CU 102 issues a command to the ML cluster 106 to perform at least a portion of the allocated decomposition of the GEMM operation. The ML cluster 106 then performs, using an ALU 108, one or more operations using the directly accessed at least one memory module. For example, one or more values stored in the memory module are provided as input to the ALU 108. The output is then provided to the CU 102 to perform additional operations. For example, the output is stored in the memory module and an address of the output is provided to the CU 102. As another example, the output is directly provided to the CU 102 by the ALU 108.

Figure 3:
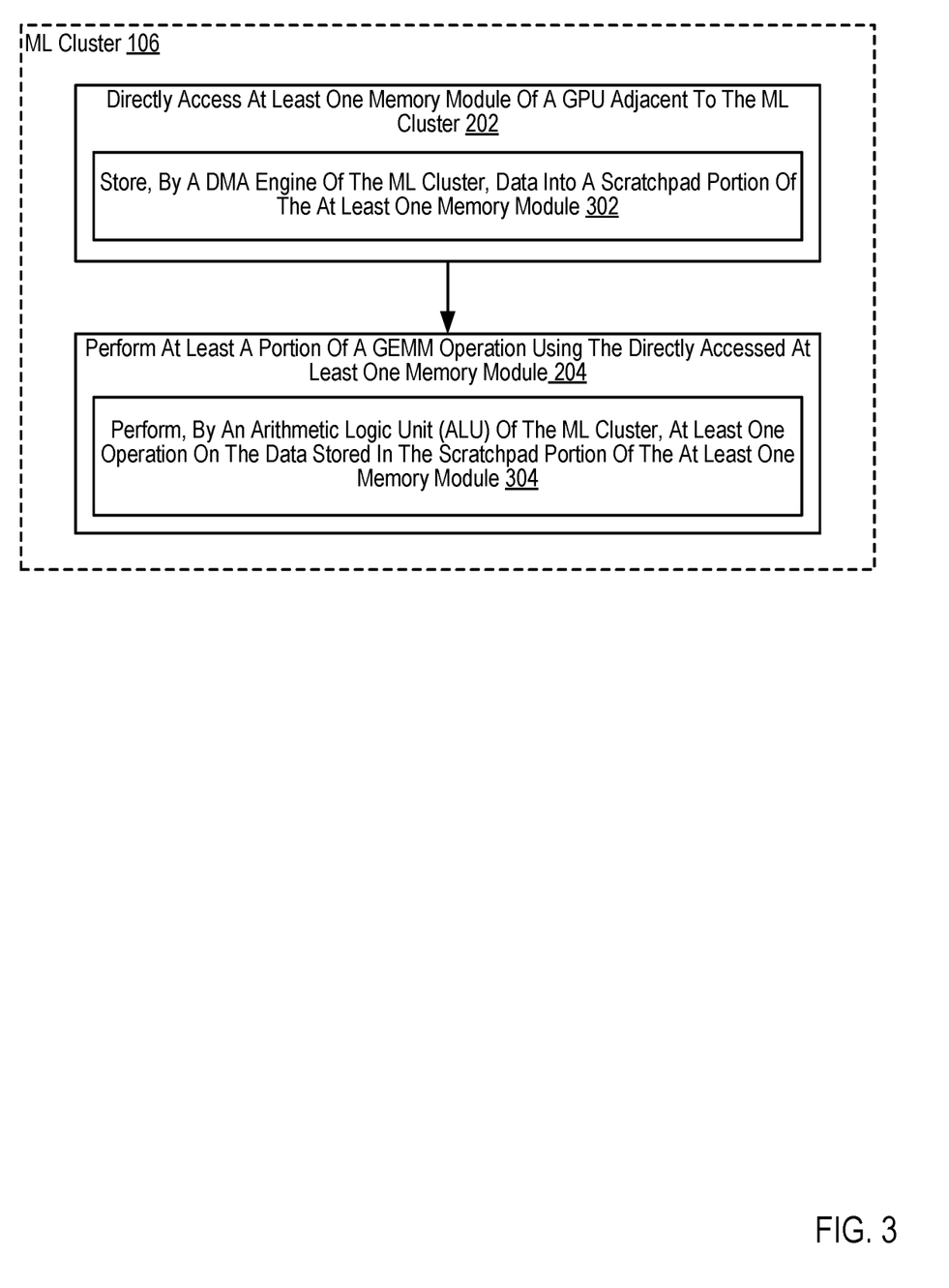
FIG. 3 is a flowchart of another example method for clustering of machine learning (ML) functional components according to some embodiments.

For further explanation, FIG. 3 sets forth a flow chart illustrating another example method for clustering of machine learning (ML) functional components according to embodiments of the present disclosure. The method of FIG. 3 is similar to that of FIG. 2 in that the method of FIG. 3 also includes directly accessing 202 (e.g., by an ML cluster 106) at least one memory module of a GPU 100 adjacent to the ML cluster 202; and performing 204 (e.g., by the ML cluster 106) at least a portion of a GEMM operation using the directly accessed at least one memory module.

The method of FIG. 3 differs from FIG. 2, however, in that directly accessing 202 at least one memory module of a GPU 100 adjacent to the ML cluster 106 includes storing 302, by a DMA engine 110 of the ML cluster 106, data into a scratchpad portion of the at least one memory module. For example, the at least one memory module includes SRAM 104. In some embodiments, the SRAM 104 is partitioned into cache memory and scratchpad memory. In other words, a first portion of the SRAM 104 is allocated as cache memory and a second portion of the SRAM 104 is allocated as scratchpad memory. The scratchpad memory is a portion of memory allocated for temporary storage of calculations or other data. As the scratchpad is allocated distinctly from the cache portions of the SRAM 104, data stored in the scratchpad memory is not maintained according to cache coherency protocols, nor is the data stored in the scratchpad memory necessarily stored in main memory, in contrast to cache memory. The use of scratchpad memory reduces latency for ALU 108 inputs and minimized data delivery power required for ALU 108 operations. Accordingly, the DMA engine 110 stores data in the scratchpad memory using a DMA operation. For example, the stored data includes operands from a command or instruction provided to the DMA engine 110, or values stored in main memory loaded by or provided to the DMA engine 110.

The method of FIG. 3 also differs from FIG. 2 in that in the method of FIG. 3, performing 204 at least a portion of a GEMM operation using the directly accessed at least one memory module includes performing 304, by an ALU 108 of the ML cluster 106, one or more operations on the data stored in the scratchpad portion of the at least one memory module. For example, the data stored in the scratchpad portion of the at least one memory module is provided as input to the ALU 108 as a sub-step of the portion of the GEMM operation allocated to the CU 102 described above.

Figure 4:
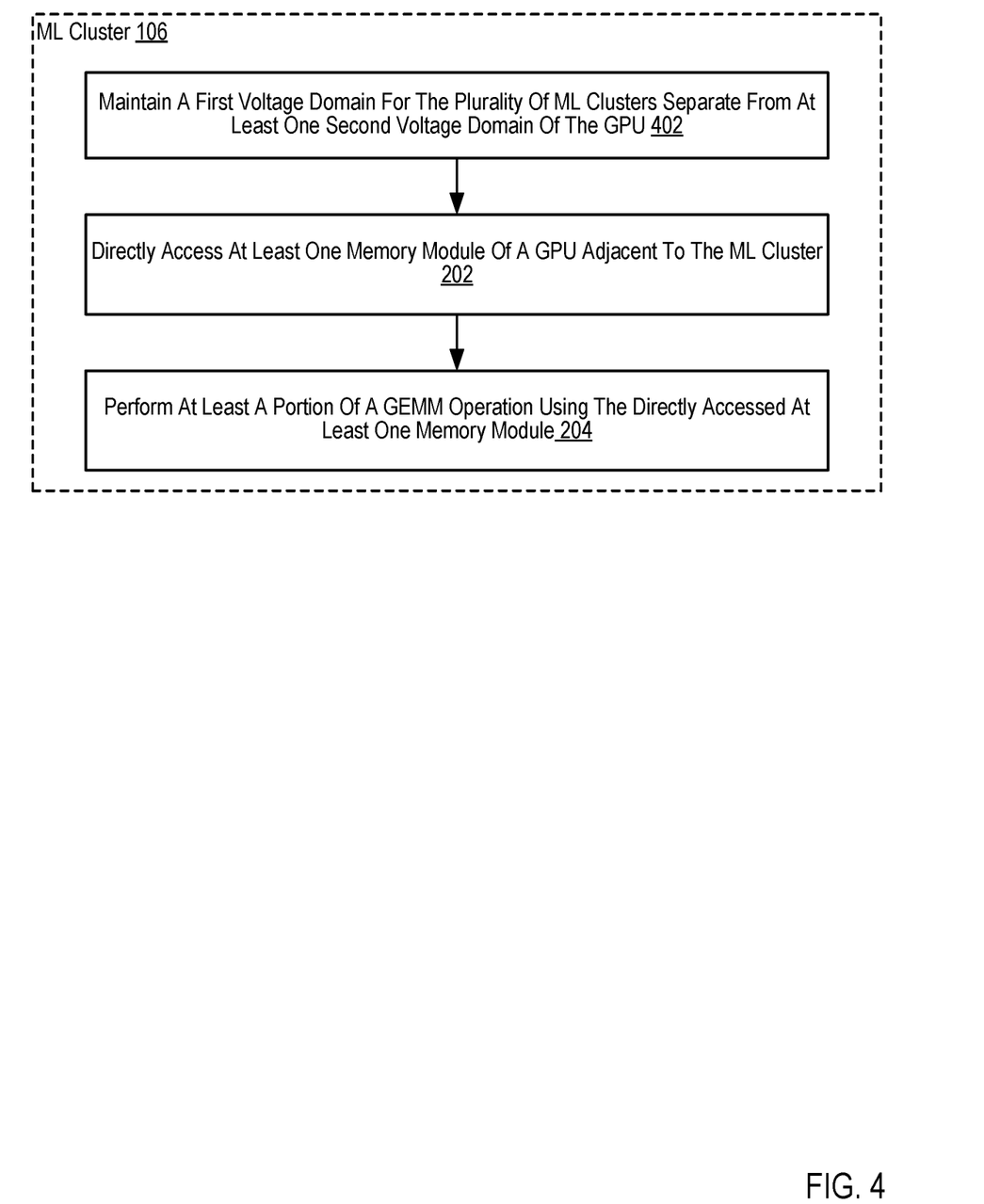
FIG. 4 is a flowchart of another example method for clustering of machine learning (ML) functional components according to some embodiments.

For further explanation, FIG. 4 sets forth a flow chart illustrating another example method for clustering of machine learning (ML) functional components according to embodiments of the present disclosure. The method of FIG. 4 is similar to the method of FIG. 2 in that the method of FIG. 4 includes directly accessing 202 (e.g., by an ML cluster 106) at least one memory module of a GPU 100 adjacent to the ML cluster 202; and performing 204 (e.g., by the ML cluster 106) at least a portion of a GEMM operation using the directly accessed at least one memory module.

The method of FIG. 4 differs from FIG. 2 in that the method of FIG. 4 includes maintaining 402 a first voltage domain for the plurality of ML clusters 106 separate from at least one second voltage domain of the GPU 100. Components within a given voltage domain receive a same voltage. Thus, the GPU 100 includes components such as voltage regulators (not shown) or other components to control voltage distribution such that the ML clusters 106 receive a different voltage relative to the remaining components of the GPU 100. It is understood that the remaining components of the GPU 100 may also receive voltages according to a single voltage domain, or multiple voltage domains. As the ML clusters 106 will use a significant amount of voltage relative to the entire GPU 100, the use of separate voltage domains increases overall power efficiency of the GPU 100 and increases the overall performance of the GPU 100 per watt of power consumed.

Figure 5:
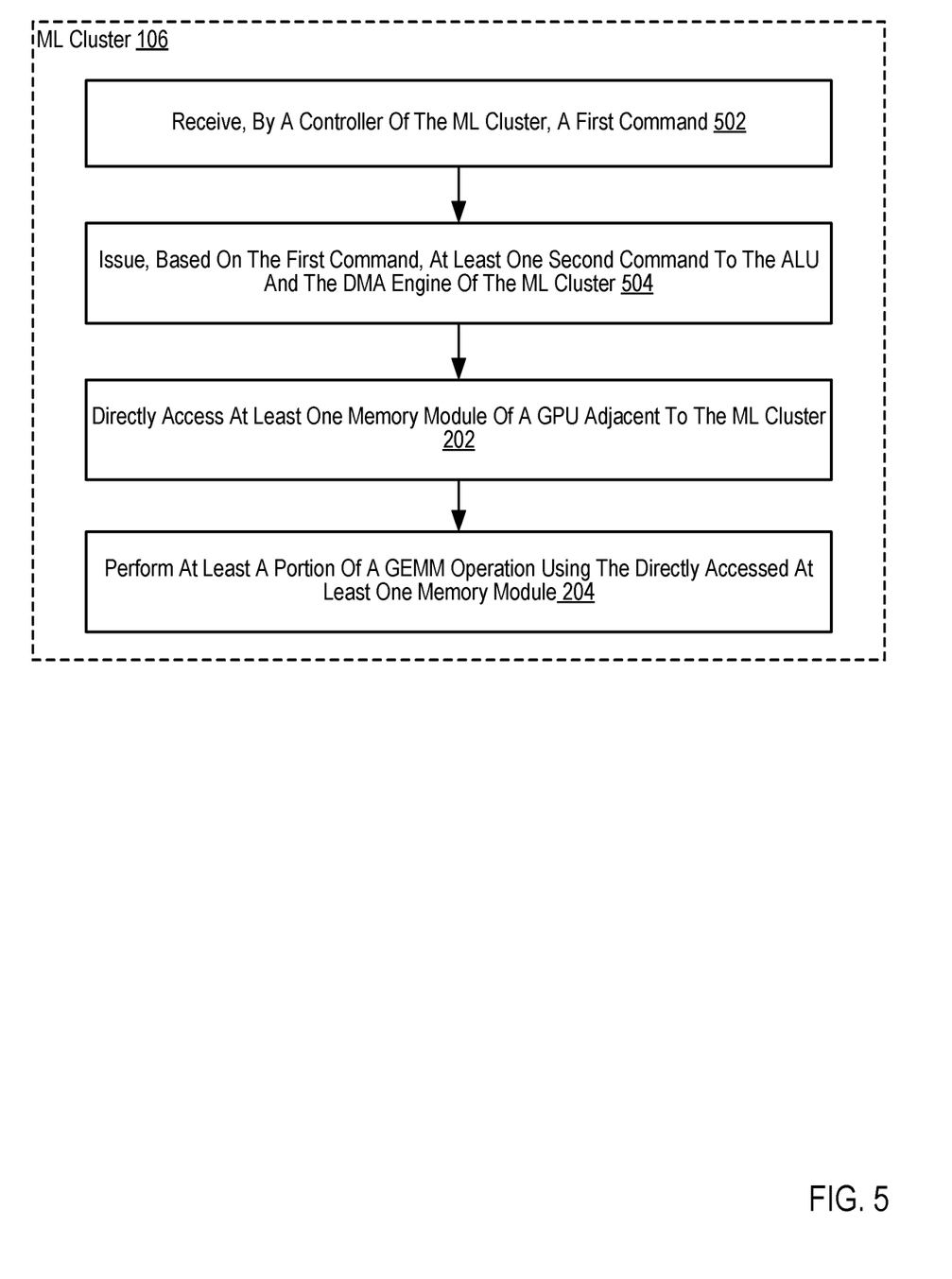
FIG. 5 is a flowchart of another example method for clustering of machine learning (ML) functional components according to some embodiments.

For further explanation, FIG. 5 sets forth a flow chart illustrating another example method for clustering of machine learning (ML) functional components according to embodiments of the present disclosure. The method of FIG. 5 is similar to the method of FIG. 2 in that the method of FIG. 5 includes directly accessing 202 (e.g., by an ML cluster 106) at least one memory module of a GPU 100 adjacent to the ML cluster 202; and performing 204 (e.g., by the ML cluster 106) at least a portion of a GEMM operation using the directly accessed at least one memory module.

The method of FIG. 5 differs from FIG. 2 in that the method of FIG. 5 includes receiving 502, by a controller 112 of the ML cluster 106, a first command. As an example, the command is associated with a GEMM operation performed by the GPU 100. Accordingly, the command is associated with a step or subprocess for a subdivision or decomposition of the GEMM operation. For example, the command is received from a CU 102 and is associated with a decomposition of the GEMM operation distributed to the CU 102. As another example, the command is received from a CP 111.

The method of FIG. 5 further differs from FIG. 2 in that the method of FIG. 5 includes issuing 504 (e.g., by the controller 112), based on the first command, at least one second command to the ALU 108 and the DMA engine 110 of the ML cluster. For example, assume that the first command indicates that one or more operations should be applied to one or more data points. The controller 112 then issues a command to the DMA engine 110 to load the one or more data points into the at least one memory module. For example, the command issued to the DMA engine 110 causes the DMA engine 110 to load the one or more data points into a scratchpad portion of the at least one memory module using a DMA operation. The controller 112 also issues a command to the ALU 108 to perform one or more operations (e.g., arithmetic operations) on the data stored in the scratchpad portion of the at least one memory module. The controller 112 issues the commands to the ALU 108 and DMA engine 110 in order to ensure proper synchronization between the ALU 108 and DMA engine 110. For example, the controller 112 issues the command to the ALU 108 to perform the one or more operations on the data stored in the scratchpad such that the ALU 108 only accesses the scratchpad after the DMA engine 110 has completed loading the data points into the scratchpad.

In view of the explanations set forth above, readers will recognize that the benefits of clustering of machine learning (ML) functional components include:

Improved performance of a computing system by increasing performance per watt used by the GPU by maintaining separate voltage domains for ML clusters.

Improved performance of a computing system by reducing data access latency and data delivery costs by reducing the distance between L2 cache and ML clusters.

Improved performance of a computing system through SRAM partially convertible to scratchpad memory, reducing latency for ML ALU input delivery and minimizing data delivery power.

Improved performance of a computing system by providing for a path for external GPUs and CPUs to control and access cache SRAM for use in ML acceleration.

Exemplary embodiments of the present disclosure are described largely in the context of a fully functional computer system for clustering of machine learning (ML) functional components. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various embodiments of the present disclosure. The descriptions in this specification are for purposes of illustration only and are not to be construed in a limiting sense. The scope of the present disclosure is limited only by the language of the following claims.

What is claimed is:

1. A graphics processing unit (GPU) for clustering of machine learning (ML) functional components, comprising:
   a plurality of compute units;
   a plurality of ML clusters, wherein each of the ML clusters comprises at least one arithmetic logic unit (ALU), and wherein each of the ML clusters is associated with a respective subset of the compute units; and
   a plurality of memory modules each positioned on the GPU adjacent to a respective ML cluster of the plurality of ML clusters, wherein each ML cluster is configured to directly access one or more adjacent memory modules.

2. The GPU of claim 1, wherein the plurality of ML clusters are associated with a first voltage domain distinct from at least one second voltage domain of the GPU.

3. The GPU of claim 1, wherein a first portion of the memory modules comprise cache memory and a second portion of the memory modules comprise scratchpad memory.

4. The GPU of claim 1, wherein the plurality of memory modules comprise static random access memory (SRAM) modules.

5. The GPU of claim 1, wherein each of the ML clusters comprise at least one direct memory access (DMA) engine.

6. The GPU of claim 5, wherein each of the ML clusters comprise a controller configured to issue commands to the at least one ALU and the at least one DMA engine.

7. The GPU of claim 1, further comprising at least one control processor configured to issue commands to the plurality of ML clusters.

8. An apparatus for clustering of machine learning (ML) functional components, comprising:
   a component;
   a graphics processing unit (GPU) operatively coupled to the component, the GPU comprising:
      a plurality of compute units;

a plurality of ML clusters, wherein each of the ML clusters comprises at least one arithmetic logic unit (ALU), and wherein each of the ML clusters is associated with a respective subset of the compute units; and a plurality of memory modules each positioned on the GPU adjacent to a respective ML cluster of the plurality of ML clusters, wherein each ML cluster is configured to directly access one or more adjacent memory modules.

9. The apparatus of claim 8, wherein the plurality of ML clusters are associated with a first voltage domain distinct from at least one second voltage domain of the GPU.

10. The apparatus of claim 8, wherein a first portion of the memory modules comprise cache memory and a second portion of the memory modules comprise scratchpad memory.

11. The apparatus of claim 8, wherein the plurality of memory modules comprise static random access memory (SRAM) modules.

12. The apparatus of claim 8, wherein each of the ML clusters comprise at least one direct memory access (DMA) engine.

13. The apparatus of claim 12, wherein each of the ML clusters comprise a controller configured to issue commands to the at least one ALU and the at least one DMA engine.

14. The apparatus of claim 8, further comprising at least one control processor configured to issue commands to the plurality of ML clusters.

15. A graphics processing unit (GPU) for clustering of machine learning (ML) functional components, comprising:

a plurality of compute units;

a plurality of ML clusters, wherein each of the ML clusters is associated with a respective subset of the compute units; and a plurality of memory modules each positioned on the GPU adjacent to a respective ML cluster of the plurality of ML clusters, wherein a ML cluster of the plurality of ML clusters is configured to directly access one or more adjacent memory modules and perform at least a portion of a general matrix multiply (GEMM) operation using the directly accessed one or more adjacent memory modules.

16. The GPU of claim 15, wherein directly accessing the one or more adjacent memory modules comprises storing, by a DMA engine of the ML cluster, data into a scratchpad portion of the one or more adjacent memory modules; and wherein performing the at least a portion of the GEMM operation comprises performing, by an arithmetic logic unit (ALU) of the ML cluster, the at least one operation on the data stored in the scratchpad portion of the one or more adjacent memory modules.

17. The GPU of claim 16, wherein a controller of the ML cluster is to receive a first command, and wherein at least one second command is issued, based on the first command, to the ALU and the DMA engine of the ML cluster.

18. The GPU of claim 17, wherein the first command is received from a control processor of the GPU.

19. The GPU of claim 17, wherein the first command is received from a compute unit of the plurality of compute units of the GPU.

20. The GPU of claim 15, wherein the plurality of ML clusters are associated with a first voltage domain separate from at least one second voltage domain of the GPU.

* * * * *